Patented Mar. 26, 1929.

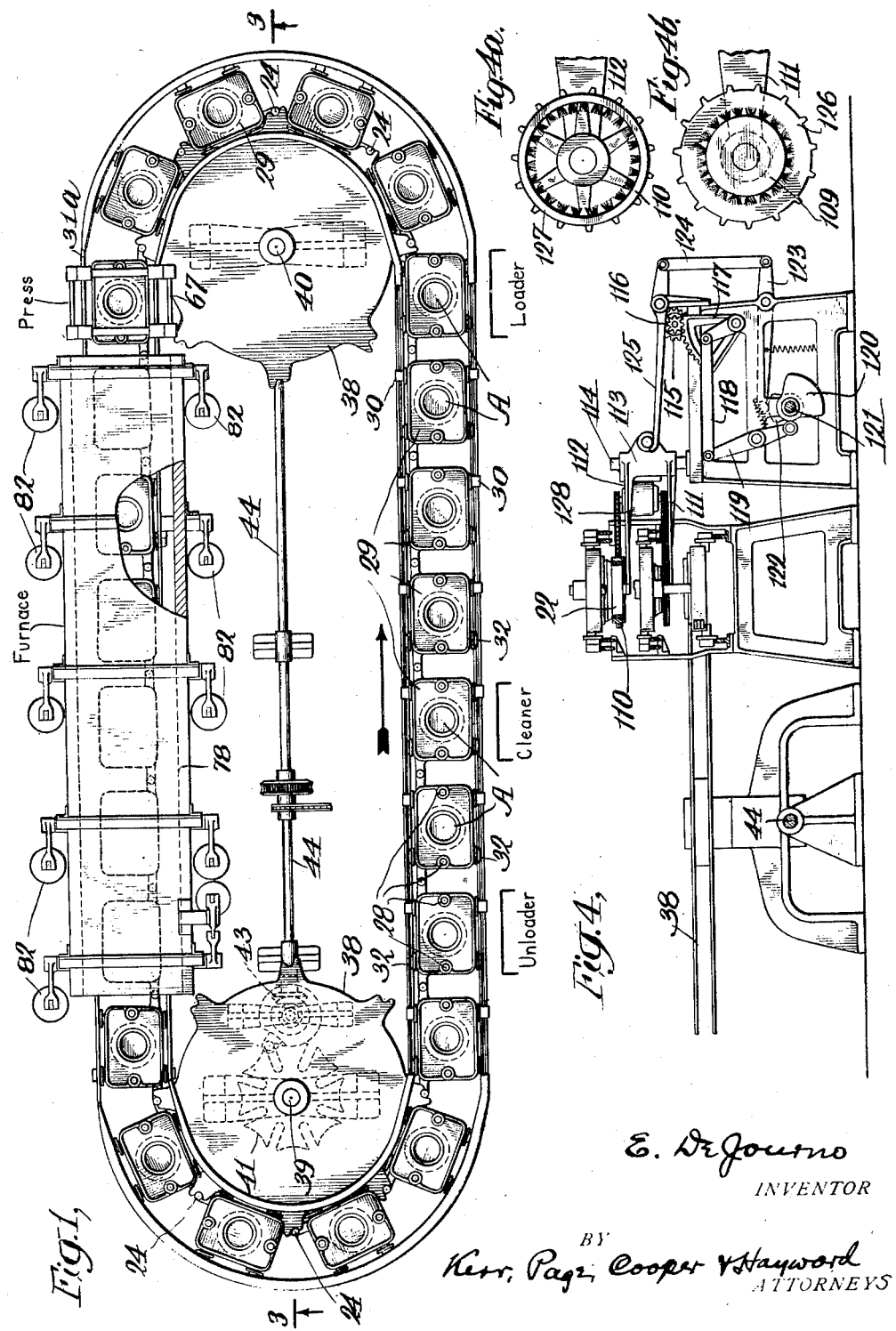

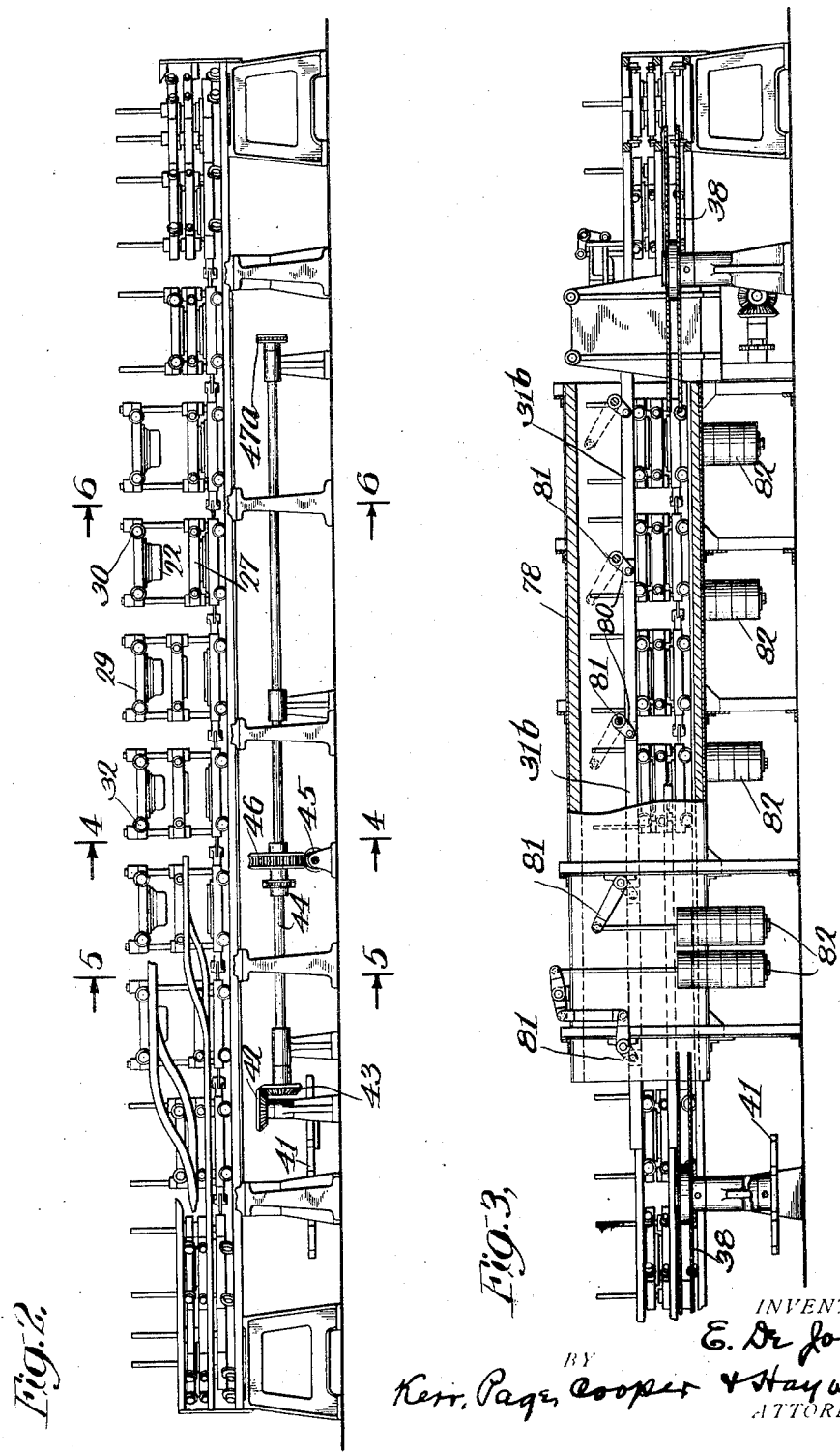

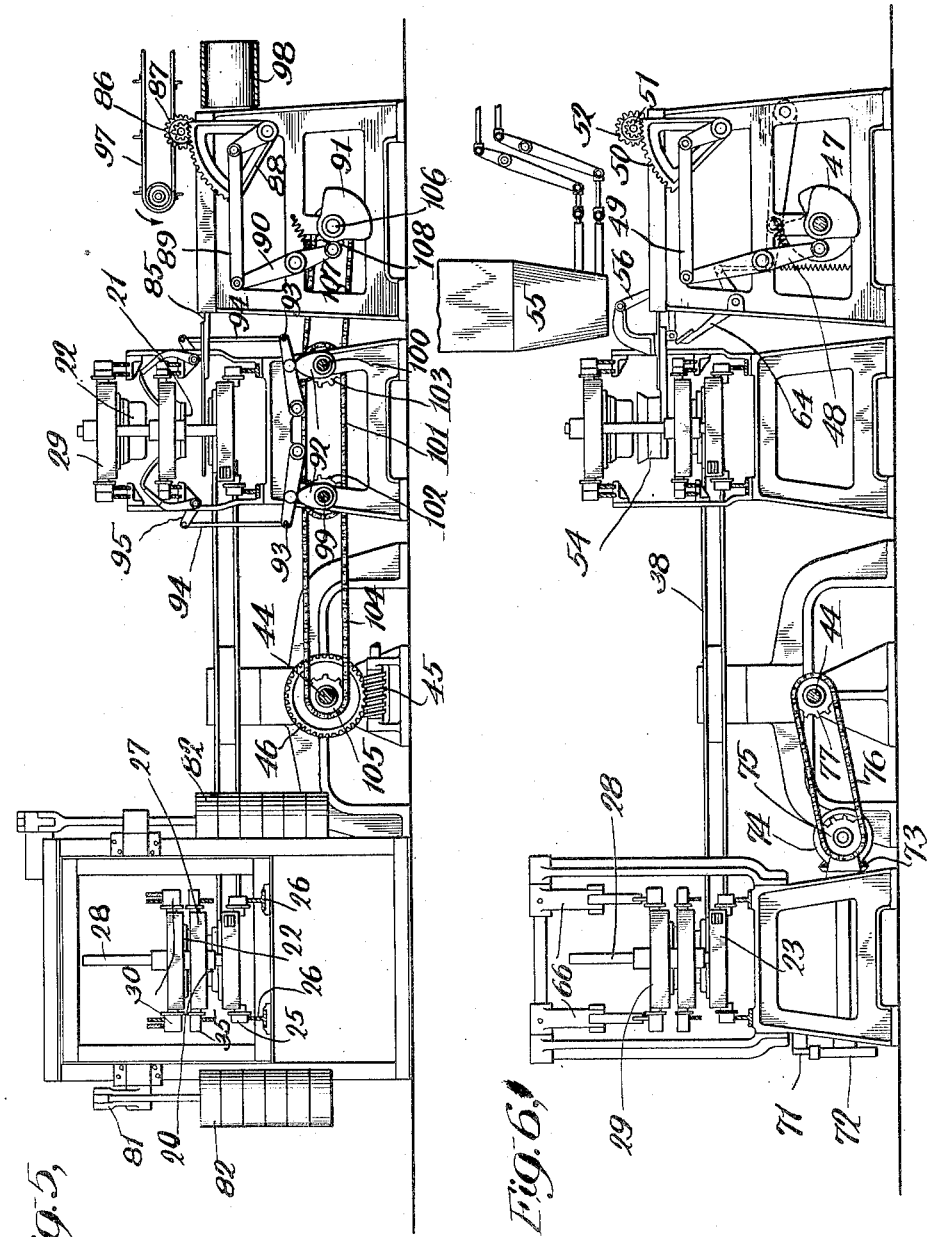

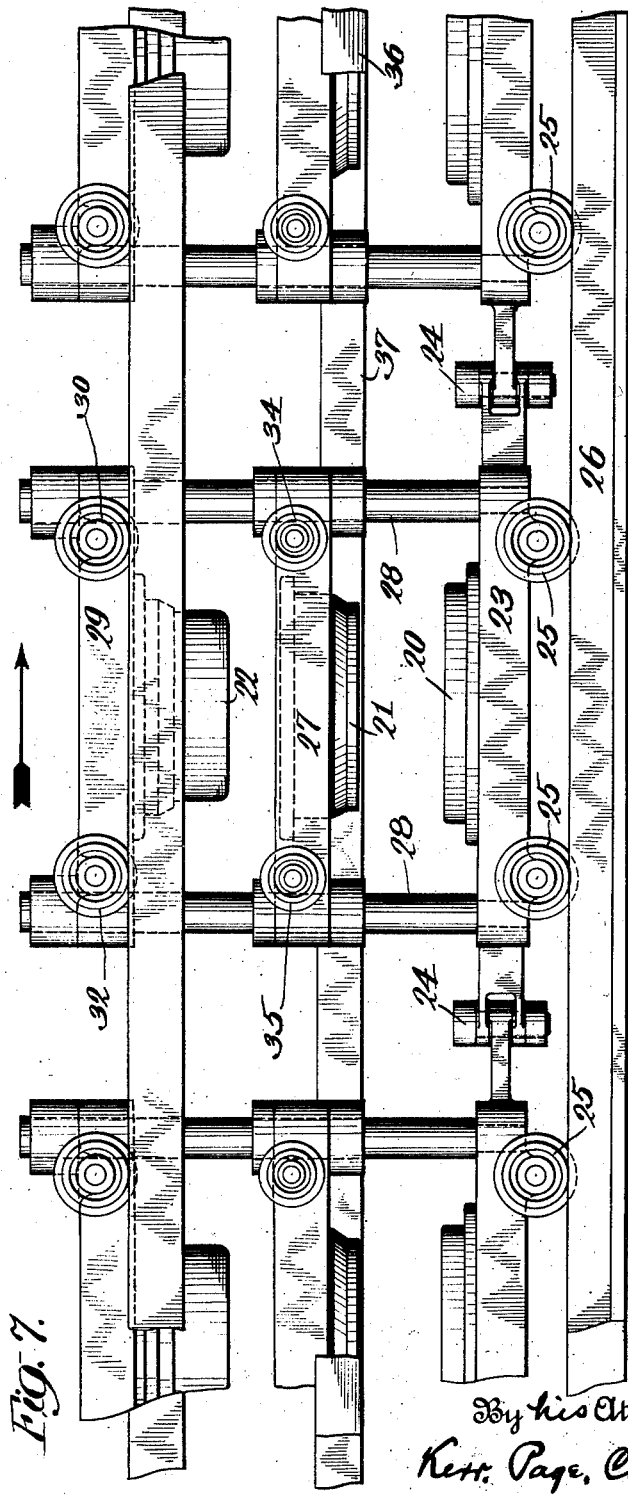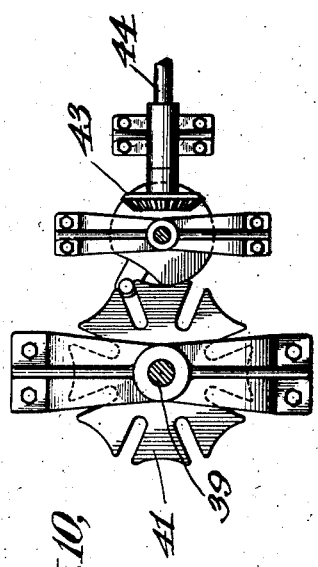

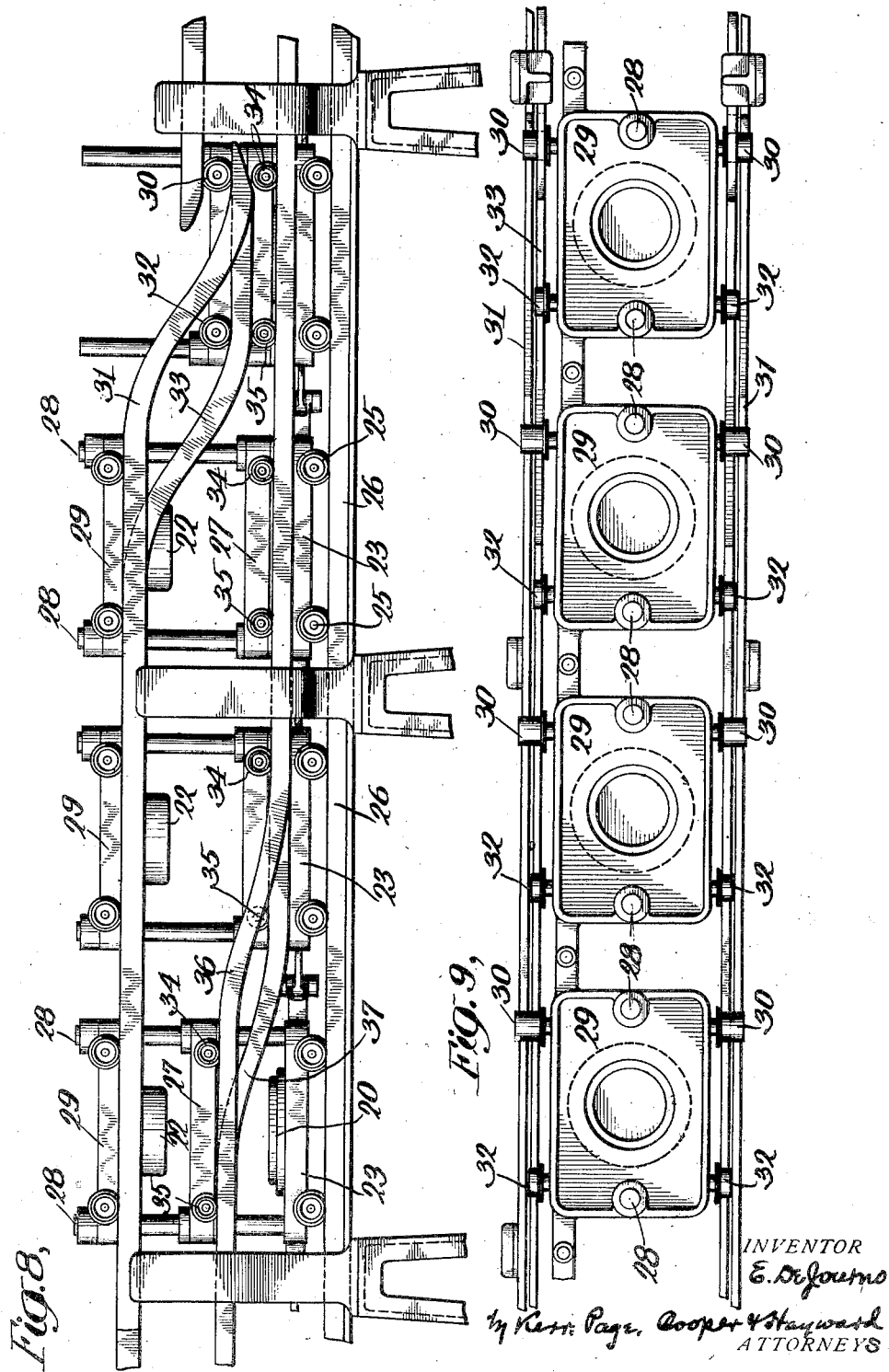

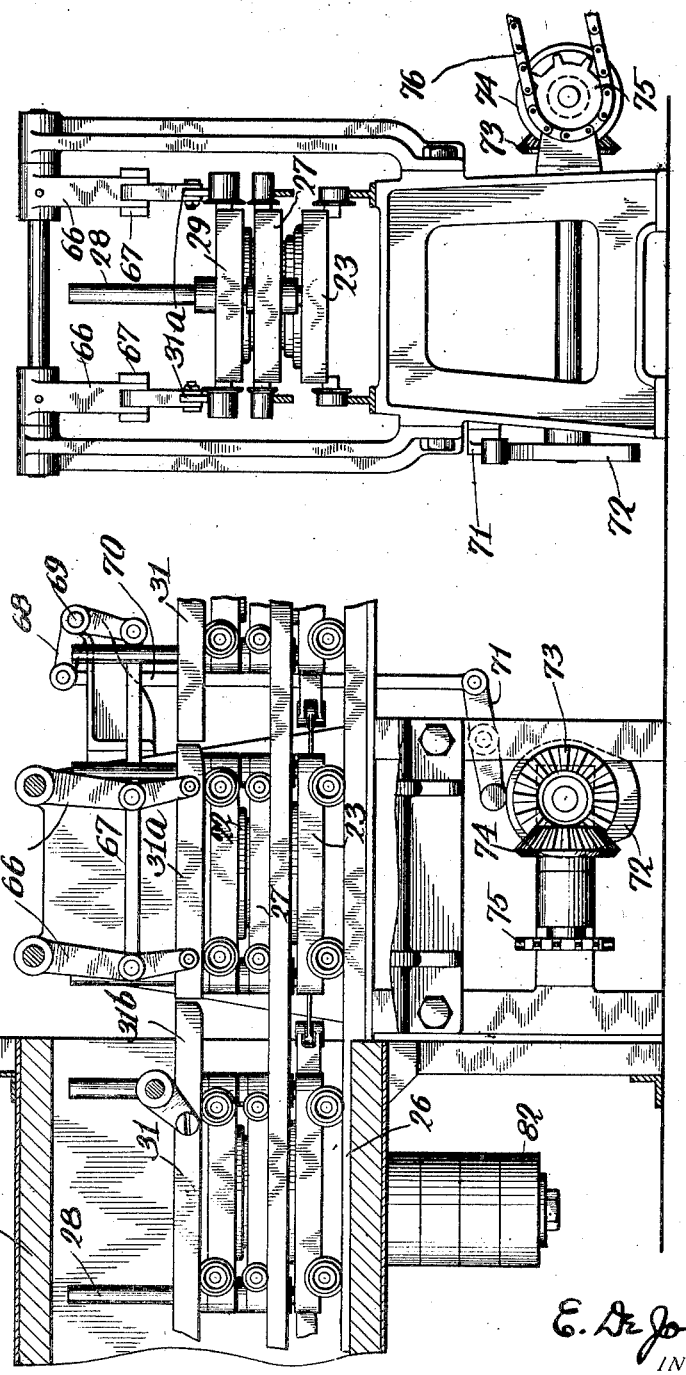

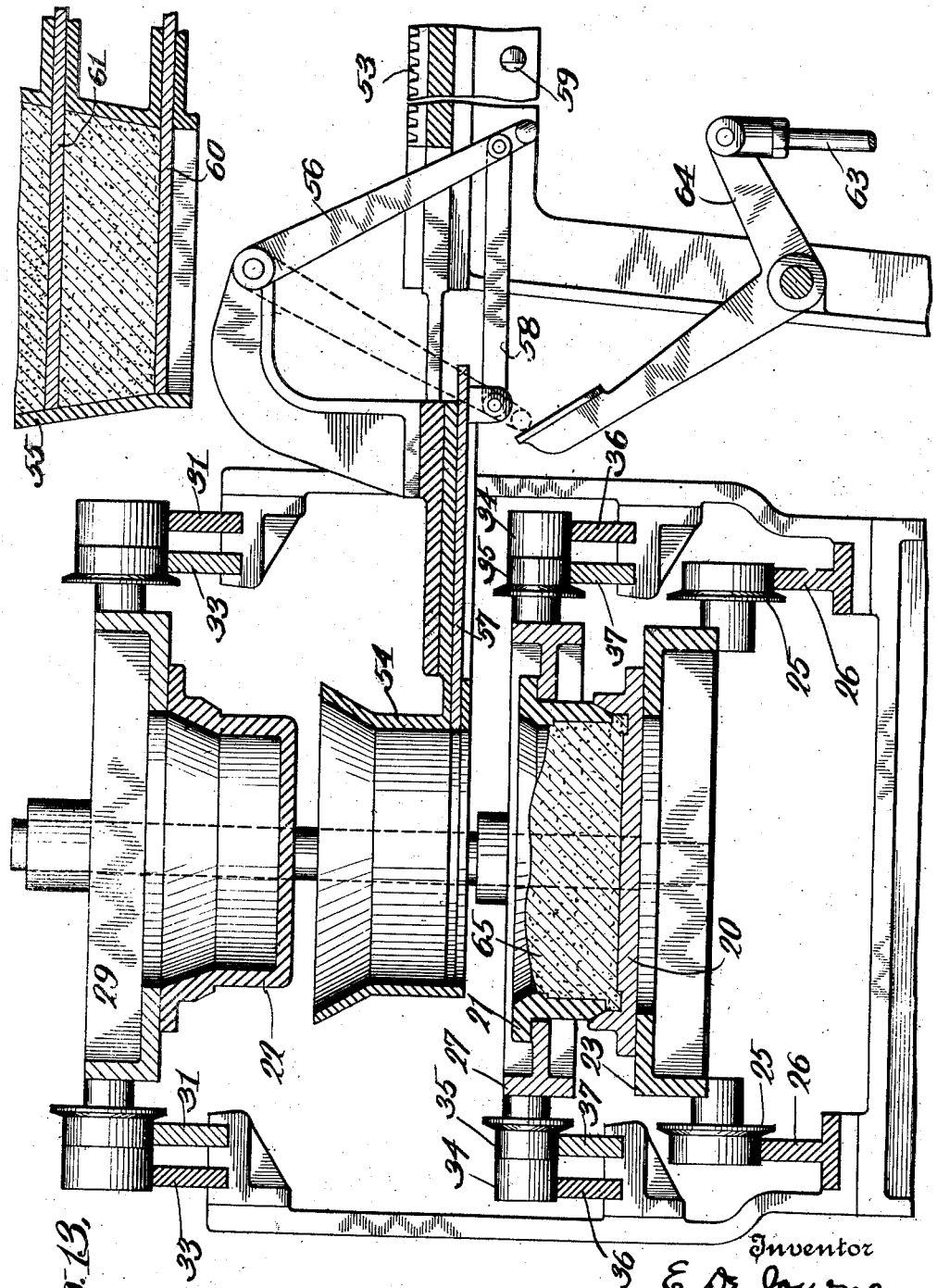

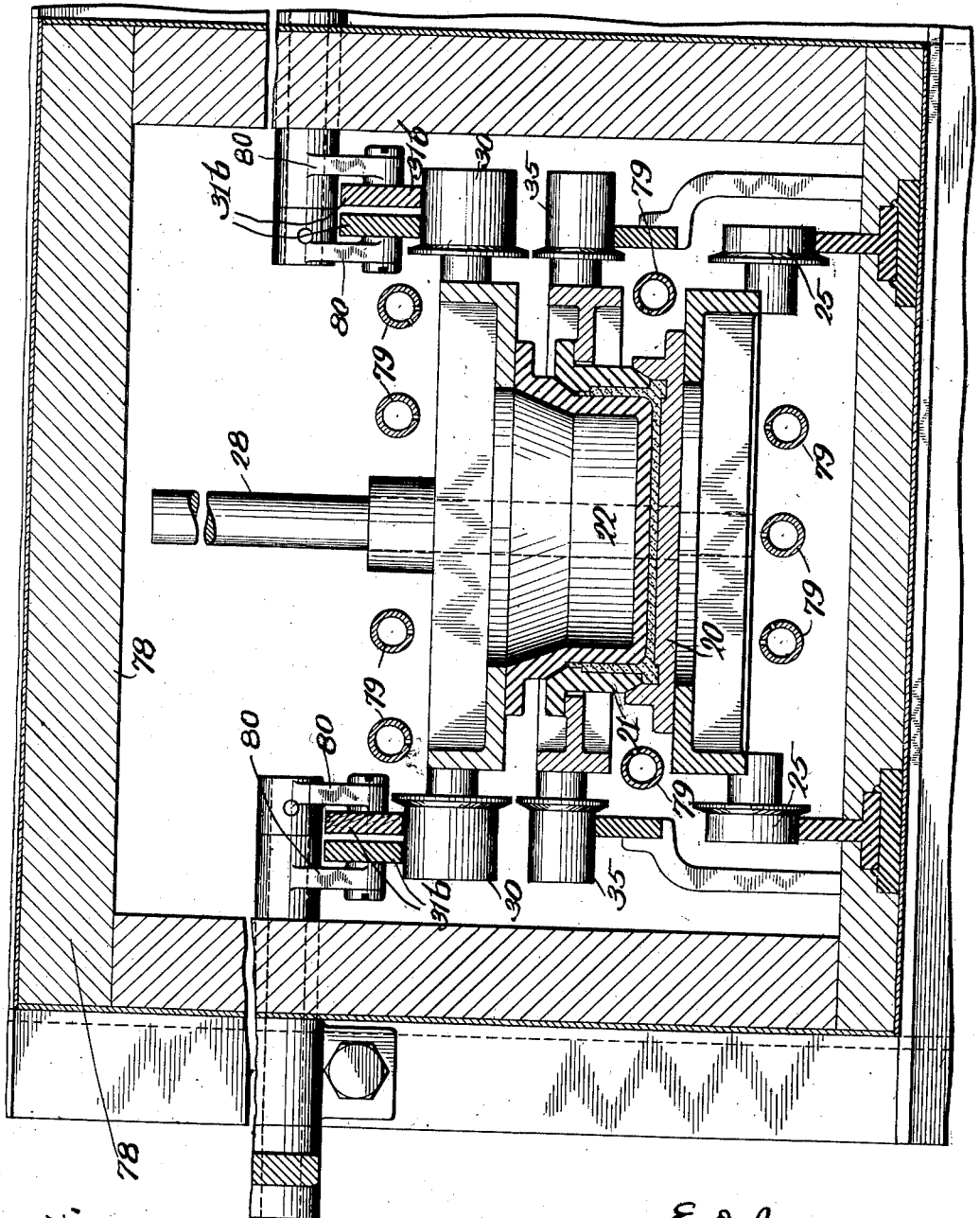

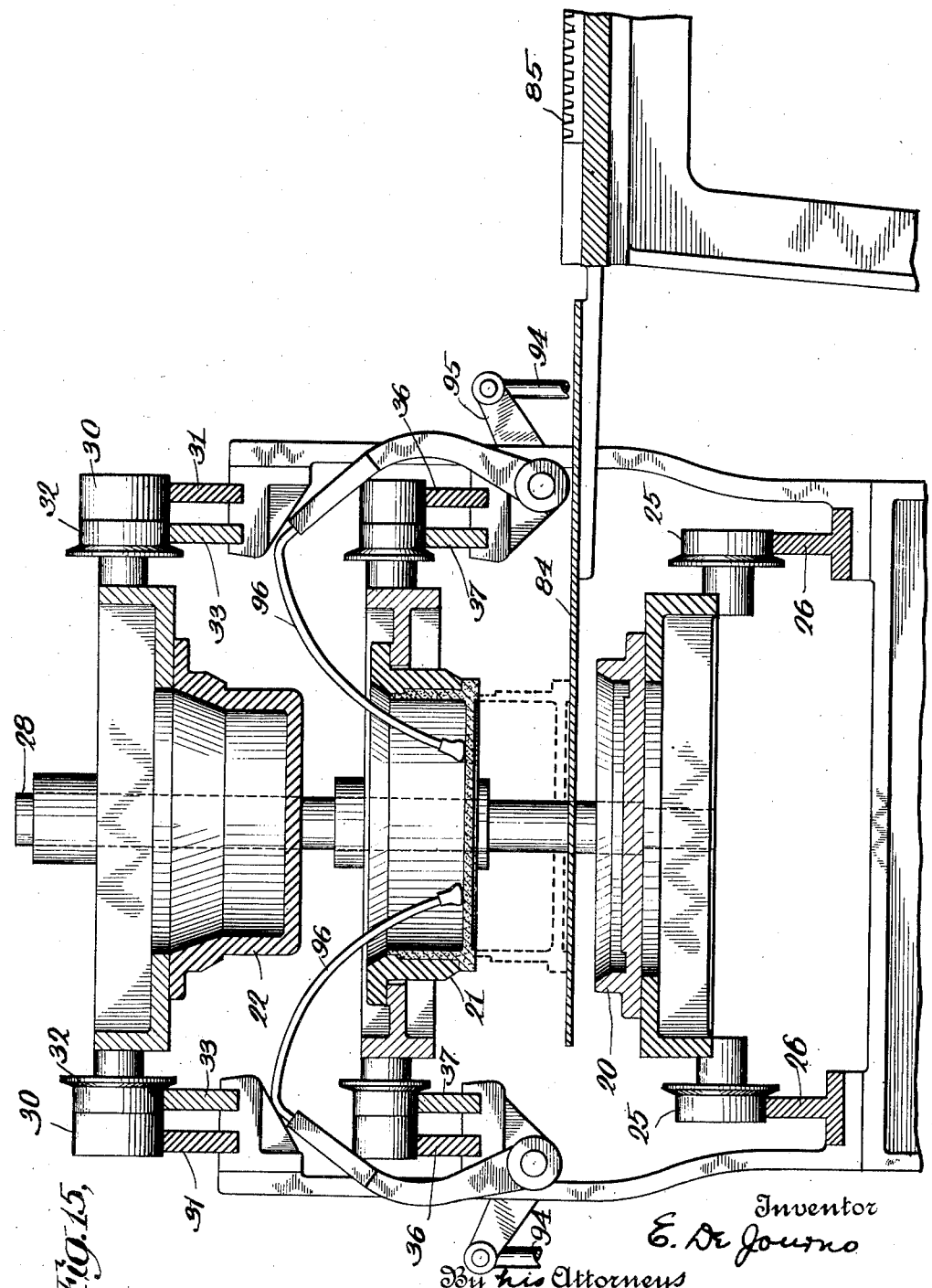

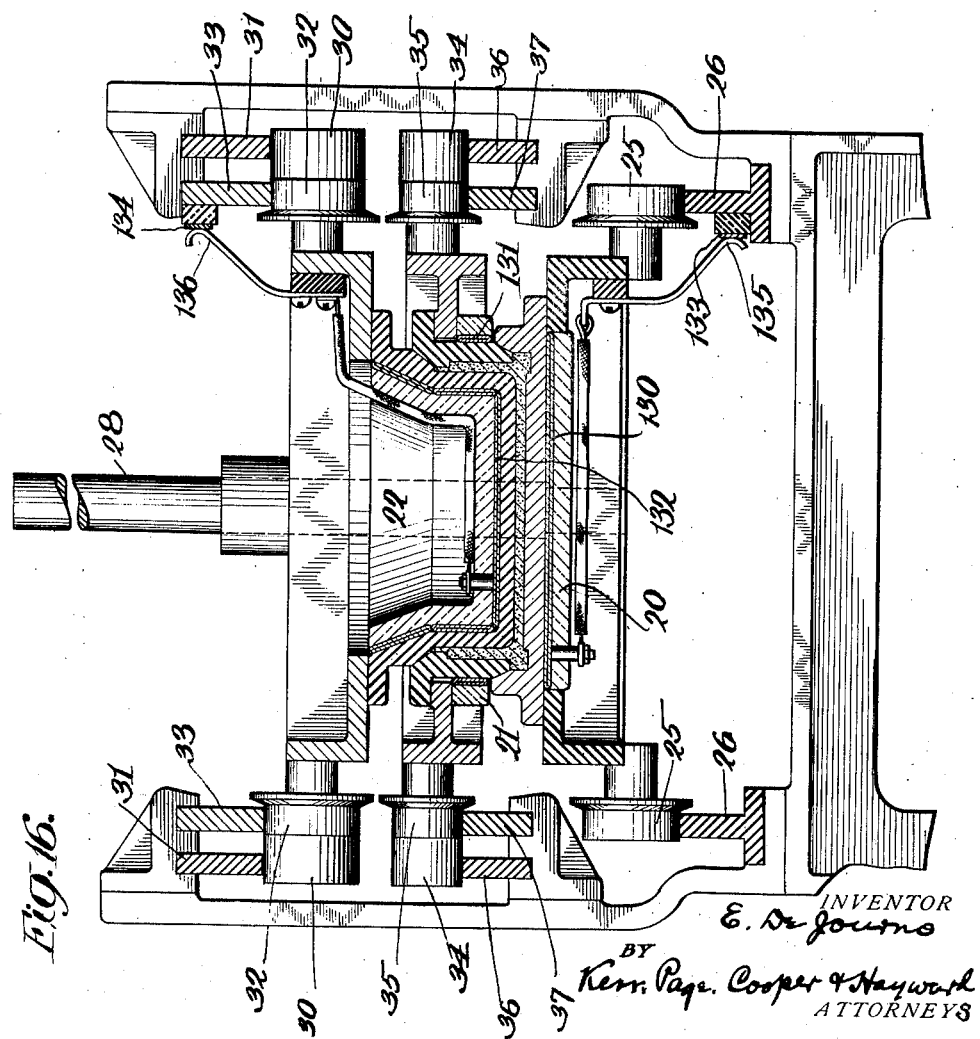

1,706,874

UNITED STATES PATENT OFFICE.

ERNEST DE JOURNO, OF NEW YORK, N. Y., ASSIGNOR, BY MESNE ASSIGNMENTS, TO DE JAY TRADING CORPORATION, A CORPORATION OF NEW YORK.

APPARATUS FOR MAKING ARTICLES OF PLASTIC COMPOSITION BY PRESSURE DIE MOLDING.

Application filed August 9, 1921. Serial No. 490,865.

This invention relates to the die-molding of plastic compositions to produce articles of various kinds, as for example boxes and other hollow articles, and its chief object is to provide an automatic or semi-automatic apparatus in which the various operations of filling the die or dies, closing the latter to form the article, heating the dies, if necessary, to cause solidification or setting of the composition, opening the dies, and removing the molded article, will be performed in proper sequence and in harmony with each other. To this and other ends the invention consists in the novel features and combinations hereinafter described.

In carrying out my invention in the preferred manner I provide a series of dies and a series of mechanisms cooperating therewith to perform the above operations, with provision for relative movement of the dies and said mechanisms. Preferably the dies are connected to form an endless series, like a belt, for example, which is moved past the various mechanisms or stations intermittently, pausing long enough at each step for the required operations to be performed. Then while one die is being filled, another which has already been filled is being pressed; another, already closed, is being heated; another, already heated and opened, is discharging the article; and so on. The machine is thus continuous in operation, receiving the plastic or semi-plastic composition at one point and discharging the molded articles at another point at a rate which is limited only by the time required for proper performance of the lengthiest operation.

The embodiment outlined above is illustrated in the accompanying drawings, in which—

Fig. 1 is a plan view of the machine, certain of the mechanisms, as the unloader, cleaner, and loader, being merely indicated to avoid confusing the figure.

Fig. 2 is a side view, from the lower portion of Fig. 1, but omitting the unloading, cleaning, and loading mechanisms.

Fig. 3 is a longitudinal section, about on line 3—3 of Fig. 1.

Figs. 4, 5 and 6 are detail cross sections on lines 4—4, 5—5 and 6—6 of Fig. 2, illustrating the cleaning mechanism, the unloading mechanism, and the filling mechanism, respectively, in their relation to the traveling dies.

Figs. 4$^a$ and 4$^b$ are detail plan views of the rotary cleaning brushes.

Fig. 7 is a detail side view on a large scale, showing several dies with their three parts separated vertically for the operations of unloading and cleaning.

Fig. 8 is an enlarged detail side view showing how the rails, on which the die-parts travel, operate to open and close the dies.

Fig. 9 is a plan view of the parts shown in Fig. 8.

Fig. 10 (on the same sheet as Fig. 7) is a detail plan view of the Geneva movement for the intermittent drive of the series of dies.

Fig. 11 is a detail side view of the die-pressing mechanism.

Fig. 12 is a section on line 12—12 of Fig. 11.

Fig. 13 is a detail cross section, on a large scale, illustrating the operation of filling a die.

Fig. 14 is a detail cross section on a large scale, showing the die in the furnace where the heat is imparted to "cook" and solidify the composition in the die.

Fig. 15 is a detail cross section on a large scale, illustrating the operation of removing the molded article, or unloading the die.

Fig. 16 is a detail cross section, on a large scale, illustrating an electrically heated die.

The machine specifically illustrated herein as the preferred embodiment of the invention is designed to utilize for making shallow circular boxes a composition of well known type, consisting of wood-pulp, coloring matter, a resinous binder, and other substances. The dies, several of which are marked A in Fig. 1, are connected to form an endless series as described below, and are each composed of three parts (Figs. 7, 13 and 14), a bottom 20, a central portion or mold body 21, and an upper portion or top 22. The lower parts or bottoms are mounted on carriages 23 pivotally connected at their inner corners by studs 24 and provided with wheels or rollers 25 to travel on the elongated endless rails 26. The mold bodies 21 are mounted on carriers 27 which are movable vertically on upright guides 28 fixed on the carriages 23 at the ends thereof, and the upper die-parts or tops 22 are mounted on carriers 29 which are similarly movable on the guides 28. The carriers 29, Fig. 9, are equipped at one end with long rollers 30 to travel on the outer rails 31 and at the other end with short rollers 32 to travel on the inner rails 33. Similarly, carriers 27, Fig. 8, are provided with long and short rollers 34, 35, to run on outer and inner rails 36, 37.

The rails 31, 33, 36, 37, on which the carriers 27 and 29 travel, are varied in vertical position at the proper points to open and close the dies. Thus, referring to Fig. 8, for example, and considering the die at the right: if the die is moving toward the left, the wheels 30, 32, entering the open "switch", ride up on the inclines and thereby raise the plunger or top 22. As the die approaches the inclines of the rails 36, 37 at the left the intermediate carrier is elevated in the same manner. Considering now the die shown at the left of Fig. 8, if this die is moving rightwardly the inclines cause the intermediate carrier 27 to descend on the guides 28, and when the inclined portions of rails 31, 33 are reached the upper carrier 29 descends. It may be stated that the rails are provided with the necessary inclines to open the dies as they pass the "unloading" station, where the molded article is ejected. Thereafter the rails are spaced to keep the dies open while they are being cleaned. Then the center rails are shaped to bring the middle die-parts or mold bodies down upon the bottom parts for filling the dies, at the filling station, then the upper rails permit the plungers to descend. Thus the die-parts are actuated in proper sequence by the mere travel of the dies along the rails.

The travel of the dies is effected by means of horizontal sprockets 38, Figs. 1 and 3, at the ends of the machine, composed of upper and lower disks cooperating with the upper and lower ends of the pivots 24. The sprockets are mounted on vertical shafts 39, 40, of which the former is rotated intermittently by a Geneva movement 41, Figs. 1, 2 and 10. The pin-wheel of the Geneva movement is rotated by bevel gears 42 and 43, the latter being fixed on the main driving shaft 44 which is itself driven by the worm and worm gear 45, 46.

The die-filling or loading mechanism, Figs. 6 and 13, is stationed near the sprocket 38 at the right of Fig. 1. Fig. 5 shows the loader just after a measured quantity of the plastic material has been discharged into the die. As this die moves away (toward the observer in Fig. 13 or rightwardly in Fig. 1) the cam 47, Fig. 6, rocks the lever 48 and, through the medium of link 49 swings the gear sector 50, which rotates the pinion 51 and the coaxial gear 52. The latter meshes with a rack 53, Fig. 13, and thus retracts the same, which in turn retracts the loading hopper 54, to which said rack is connected, and carries it to a position immediately below the receptacle 55, Fig. 6, containing a supply of the plastic material. As the hopper moves back, the arm 56, Fig. 13, connected to the sliding hopper bottom 57 by a link 58, strikes the stud 59 and is swung leftwardly, thereby closing the hopper. The sliding bottom 60 of the receptacle is now retracted, allowing the material below the sliding cut-off 61 to fall into the hopper. The cam 47, Fig. 6, then swings the sector 50 counterclockwise, thereby advancing the loaded hopper, and when the latter is over the open die the cam 62, Fig. 6, connected by link 63 to bell crank 64, Fig. 13, swings the arm 56 to the right and opens the hopper, as shown in the figure just mentioned, thus allowing the hopper contents to fall into the open mold. At the same time the bottom 60 of the receptacle 55 is advanced and the cut-off 61 retracted, permitting the material to descend upon the bottom 60, after which the cut-off is again advanced, thereby measuring out another charge of plastic material. The mechanism for operating the bottom 60 and cut-off 61 is operated in harmony with the movement of the hopper 54, and since mechanisms for such purposes are well known it is deemed unnecessary to illustrate such means here. In Fig. 13, the plastic material 65 is shown as practically filling the mold or die. This is for the reason that the preferred material is of a light, fluffy consistency when in its uncompacted state and has to be greatly reduced in volume to give the completed article the desired density. The cam 47 may be driven from a sprocket by means of a sprocket and chain, not shown, from a sprocket 47ª on the main driving shaft 44, Fig. 2.

The die being filled or loaded, as described above, it moves on; and the plunger 22, as the die moves around the adjacent sprocket 38, is brought down into the die-part 21 (as indicated in Fig. 14) by suitable inclines in the upper rails, as previously explained, and reaches the compression station, where the plunger 22 is pressed powerfully into place. For this purpose the upper rails 31, Figs. 11 and 12, are provided with vertically movable sections 31ª, hung on toggle levers 66, connected by links 67 to bell cranks 68 on a cross shaft 69. One of the bell cranks is connected by a depending link 70 to a lever 71 cooperating with a cam 72. When the die comes under the rail sections 31ª the cam rocks lever 72 and straightens the toggles, thereby pressing the carrier 29 and plunger 22 down, through the medium of the rail sections 31ª and the rollers on the carrier, after which the rise on the cam passes the lever and allows the weight of the link 70 to buckle the toggles, thereby freeing the die sufficiently to permit it to move on. The cam 72 is rotated by bevel gears 73, 74, the latter driven by a sprocket 75 and chain 76 from a sprocket 77 on the main driving shaft, Fig. 6.

Leaving the pressure rail-sections 31ª, the die passes under the rail sections 31ᵇ, Figs. 2, 5, 11 and 14, inside of the muffle furnace 78, where the die is heated by gas flames from the burner-pipes 79 extending longitudinally of the furnace. The rail sections 31ᵇ are suspended from links 80 and bell crank levers 81, Fig. 3. The latter are connected with weights 82 which constantly urge the rail sections downwardly, thereby exerting a continuous "following" pressure on the die plungers as the dies travel through the furnaces. This feature is a highly advantageous part of the invention, as it insures that the finished articles will be substantially uniform in density of the material composing them, regardless of variation in the amount of material supplied to the dies. Thus if a die is delivered to the toggle-press (Fig. 11) with less than the normal amount of material, the downward movement of the plunger produced by the cam 72 may not be sufficient to give all the compacting desired, but when the die moves under the rail-sections 31ᵇ the "follower" pressure continuously exerted by the weights 82 imparts the necessary additional pressure, and this pressure is not relieved until the "cooking" is completed and the die leaves the furnace. In short, during the cooking the material in the dies is under a continuously acting yielding pressure, which gives a uniform degree of compacting and hence a uniform density. If the pressure developed in the mold by the evolution of steam or other vapor or gas is sufficient to overcome the pressure exerted by the weights, the mold-tops are lifted by the internal pressure, allowing more or less of the steam to escape, whereupon the mold-top descends again. This operation, which may take place a number of times, prevents the pocketing of steam in the mold and the consequent formation of superficial or internal voids or hollows in the molded article.

Issuing from the furnace 78, the dies pass around the left sprocket 38 (Fig. 1) and meeting suitable inclines in the rails, the plunger or upper die-part 22 and the center die-part 21 are separated vertically just before they reach the unloading mechanism, Figs. 5 and 15. At this station a tray or carrier 84 is advanced between the mold bottom 20 and mold body 21, by means of a rack 85 actuated by a gear 86 driven by a pinion 87 meshing with a sector 88, which latter is rocked by a link 89, lever 90 and cam 91 in harmony with the travel of the die. As soon as the carrier or tray is under the die-part or mold body 21 the cams 92, Fig. 5, rock the levers 93, which, through the instrumentality of links 94, rock the bell cranks 95, Fig. 15, carrying the ejecting fingers 96. The latter are thus projected into the die and caused to strike the article lightly, thereby dislodging it and permitting it to drop upon the carrier or tray 84. The cam 91, Fig. 5, now rocks the sector 88 clockwise, withdrawing the carrier and the article thereon. Arriving under the overhanging transverse conveyer 97, a finger thereon catches the article and slides it off the tray and upon the longitudinal conveyer 98, which carries the article away. When the tray has been withdrawn the unloaded die can travel on to the cleaning station, described below. Cams 93 are mounted on cam shafts 99, 100, connected by chain 101 and sprockets 102, 103, shaft 99 being driven from the main shaft 44 by a chain 104 and sprocket 105. Cam shaft 106, on which cam 91 is mounted, is driven from shaft 100 by means of chain 107 and sprocket 108. The conveyers 97 and 98 may be driven by any suitable mechanism, not shown.

Between the unloader and the loader the empty dies, still open, are subjected to a brick cleaning by means of rotary brushes to remove any particles of the plastic material which may be left adhering to the die-surfaces and which might deface the succeeding articles or impede their smooth ejectment. For this purpose inner and outer revolving brushes 109, 110, Figs. 4, 4ª and 4ᵇ, are provided, mounted on arms 111, 112 extending from a carrier 113 which is itself movable vertically on a standard 114. The latter is fixed on a sliding rack (not shown in Fig. 4 but similar to the rack 85, Fig. 15) which is advanced and retracted by a gear 115 rotated by a pinion 116 meshing with a gear sector 117. The latter is rocked at suitable intervals by a link 118 and lever 119 actuated by a cam 120 on shaft 121 which is driven by a sprocket and chain (not shown) from the main shaft 44. As the die comes to rest in front of the cleaning station the cam rocks the sector leftwardly, thereby advancing the carrier 113 and positioning the brushes 109 and 110 directly below the middle and upper die-parts. Cam 122, on shaft 121, now rocks lever 123, depressing link 124 and rocking lever 125, which lifts the carrier 113 on standard 114 and brings the brushes into engagement with the die-parts, brush 110 on the outside of the plunger 22 and brush 109 on the inside of the die 21. As will be seen in Fig. 4ª, brush 110 is in the form of a ring, with inwardly extending bristles. Both brushes are mounted in or upon sprockets 126, 127, connected by chains to sprockets on the shaft of an electric motor 128 mounted on the carrier 113. The motor may run continuously, or suitable make-and-break devices may be provided to close the motor circuit as the carrier is advanced and to open the circuit as the carrier is retracted. When the die is about to move on, toward the loading mechanism, the cam 122 lowers the brushes out of engagement with the die-parts, and cam 120 retracts the carrier and brushes out of the path of the die, which then begins its travel to the loading station. I do not show means for cleaning the die-bottom, as such means are in general unnecessary, since the bottom of the molded article does not require the perfection of finish desired for the sides and interior of the article. Moreover, the die-bottom separates from the article directly, without relative sliding movement, and hence particles of the composition adhering to the die-bottom are not apt to prevent the separation.

The operations described constitute the complete cycle of the machine, and are repeated automatically as long as the machine is driven.

In the construction illustrated in Fig. 16, the heating of the die or mold and its contents is effected electrically, which in some cases is more advantageous than the use of a gas-fired furnace or the like, for the reason that the electrical method can be so used as to put the source of heat closely adjacent to the mold-contents and can, moreover, be more accurately controlled, in general. In the construction shown, the three mold-parts 20, 21, 22 are provided with heating elements or resistances 130, 131 and 132 respectively, which may be connected with the source of current represented by the insulated rails 133 and 134 by means of contact shoes 135, 136 sliding thereon.

It is to be understood that the invention is not limited to the specific construction herein illustrated and described but can be embodied in other forms without departure from its spirit.

I claim:

1. In a machine for making die-molded articles of plastic material, in combination, a series of die assemblies each assembly in itself composed of a plurality of parts, said parts adapted when opened to either receive plastic material or deliver a completed article therefrom and said parts adapted when closed to completely encase and act as a closed mold for the articles to be made, the aforesaid assembly relation of the die parts which constitute one complete die assembly for encasing and molding a complete molded part being maintained irrespective of the open or closed condition of the mold parts so that all parts of one assembly can travel together; a series of mechanisms to cooperate with the dies, one to supply plastic material thereto, another to compress the material in the dies to mold the articles, and another to carry away the molded articles; and means for moving one of said series past the other for cooperation of the several mechanisms with the several dies in succession.

2. In a machine for making die-molded articles of plastic material, in combination, a series of dies, each in itself composed of a plurality of parts, said parts adapted when opened to either receive plastic material or deliver a completed article therefrom and said parts adapted when closed to completely encase and act as a closed mold for the articles to be made; means for maintaining an assembly relation of all the parts which constitute a single die adapted to mold and encase and mold one complete article irrespective of the open or closed position of said parts so that the parts can travel together as a complete assembly; a series of mechanisms to cooperate with the dies, one to supply plastic material thereto, another to compress the material in the dies to mold the articles, and another to carry away the molded articles, one of said series being adapted to travel past the other; means for actuating the traveling series intermittently to cause a step-by-step movement thereof; and means for actuating said mechanism in harmony with said step-by-step movement.

3. In a machine for making die-molded articles of plastic material, in combination, a series of die assemblies, each assembly being complete in itself and composed of a plurality of parts, said parts adapted when opened to either receive plastic material or deliver a completed article therefrom and said parts adapted when closed to completely encase and act as a closed mold for the articles to be made; means for maintaining the assembly relation of the parts which constitute a single mold irrespective of the open or closed position of the mold parts so that the parts which constitute one assembly can all travel together; a track on which said dies are mounted to travel, means for moving the dies along said track, a series of mechanisms adjacent to the track to cooperate with the dies as they pass, to load the dies with plastic material, to compress the material in the dies, to mold the articles, and to carry away the molded articles, and means for actuating said mechanisms in harmony with the movement of the dies past the mechanisms.

4. In a machine for making die-molded articles of plastic material, in combination, a series of dies, each in itself composed of a plurality of parts, said parts adapted when opened to either receive plastic material or deliver a completed article therefrom and said parts adapted when closed to completely encase and act as a closed mold for the articles to be made; a track on which said dies are mounted to travel, means for moving the dies along said track, mechanism adjacent to the track to deliver plastic material to the dies in succession as they pass, pressing mechanism adjacent to the track to cooperate with the dies in succession as they pass to compress the material in the dies, means for heating the compressed material in the dies, mechanism for carrying away the articles from the dies, and means for actuating said mechanisms in harmony with the movement of the dies past the same.

5. In a machine for making die-molded articles of plastic material, in combination, a series of molds each arranged as a complete assembly in itself and each composed of separable parts, said molds when closed being adapted to completely encase and act as a closed mold for the articles to be made; means for maintaining an assembly relation of separable parts which constitute a single mold irrespective of the open or closed condition of the mold parts constituting such single mold assembly so that the parts of one complete mold assembly always maintain an assembly relation to each other; a series of mechanisms arranged to cooperate with the molds, one to supply plastic material thereto, another to close the molds and press the material therein, and another to carry away the molded articles; means for moving one of said series past the other; means for separating the mold parts to deliver the molded articles to the last mentioned mechanism, and means for subsequently again moving one of said series past the other to repeat the cycle of operations of the machine.

6. In a machine for making die-molded articles of plastic material, in combination, a series of molds each composed of separable parts adapted to be opened and closed, said molds when closed being adapted to completely encase and act as a closed mold for the articles to be made, means for moving the molds in a predetermined path, a track to support a lower mold-part in its travel, a track above the first to support an upper mold-part in its travel, one of said tracks having an inclined portion to cause vertical separation of the said upper and lower mold-parts as the molds pass, and mechanism adjacent to the track to cooperate with the molds in succession after they pass said inclined portion.

7. In a machine for making die-molded articles of plastic material, in combination, a traveling series of molds each composed of vertically separable parts adapted when closed to completely encase and act as a closed mold for the article to be made, a plurality of tracks one above the other to support the mold-parts and provided with inclines to separate the mold-parts and later bring them together as they pass, mechanism adjacent to the tracks to receive molded articles discharged from the mold after the mold-parts are separated, mechanism adjacent to the track in advance of the first-named mechanism to deliver plastic material into the molds before the same are closed, and mechanism for subjecting the mold-parts to pressure after they are closed.

8. In a machine for making die-molded articles of plastic material, in combination, a traveling mold composed of vertically separable parts, tracks arranged one above the other to support the mold parts as they travel, and having inclines to separate the mold-parts and later bring the same together again, a reciprocating carrier adjacent to the track and adapted to be introduced between separated mold-parts to receive and carry away a molded article, and means for actuating said carrier in harmony with the travel of the molds.

9. In a machine for making die-molded articles of plastic material, in combination, a traveling mold composed of vertically separable parts, tracks arranged one above the other to support the mold-parts, and having inclines to separate the mold parts as they pass, and means beyond such inclines for introducing a carrier between separated parts of the mold to receive and carry away a molded article.

10. In a machine for making die-molded articles of plastic material, in combination, a three-part mold comprising a mold top, a mold body, and a mold bottom; means for separating the three parts of the mold; means to receive and carry away an article ejected from the mold after the parts thereof are separated; means for bringing the mold top and mold bottom together to receive a charge of plastic material; means for delivering plastic material to the mold body; means for pressing the mold top upon the plastic material in the mold body; means for heating the mold; and means for continuously exerting pressure upon the material in the mold while the same is being heated.

11. In a machine for making die-molded articles of plastic material, in combination, a mold composed of relatively movable parts, means for pressing the parts of the mold together to form the article to be molded, means for heating the mold, and gravity-actuated means for exerting a yielding pressure on the mold parts to keep the mold contents under yielding pressure while being heated.

12. In a machine for making die-molded articles of plastic material, in combination, a traveling mold composed of relatively movable parts, tracks between which the mold travels, one of said tracks being movable toward and from the other, gravity-actuated means associated with the movable track to urge the same toward the other and thereby exert a yielding pressure on the mold-parts, and means for heating the mold while it is traveling along said movable track.

13. In a machine for making die-molded articles of plastic material, in combination, a mold composed of relatively movable upper and lower parts, a horizontal track on which the lower mold-part travels, a vertically movable upper track under which the upper mold-part travels, weighted means associated with the upper track to urge the latter downwardly and thereby exert a yielding pressure on the upper mold-part, and means for heating the mold as it travels along said tracks.

14. In a machine for making die-molded articles of plastic material, in combination, a traveling mold having a vertically movable portion, a horizontal track on which the mold travels, an upper track under which the mold travels, bell crank levers connected with the upper track, and weights connected with the upper track to rock the bell crank levers and depress the upper track as the mold travels under the same.

15. In a machine for making die-molded articles of plastic material, in combination, a series of traveling molds each composed of separable parts, means for cooperatively maintaining an assembly relation of all the parts which constitute a single complete mold assembly so that the parts of each mold are adapted to travel together as one complete assembly unit when either separated or closed, means for separating the parts of the mold as they pass a predetermined point in the path of the molds, and means for cleaning one or more of the separated mold parts.

16. In a machine for making die-molded articles of plastic material, in combination, a series of traveling molds each composed of separable parts, means for imparting a step-by-step movement to both of the separable parts of the molds, means for separating the parts of the molds at a predetermined point in their path, a mold-cleaning device movable into and out of the path of the molds while the latter are at rest, and means for actuating said device.

17. In a machine for making die-molded articles of plastic material, in combination, an endless series of horizontally traveling molds each composed of vertically separable parts, means for imparting a step-by-step movement to the molds, means for separating the parts of the molds while the latter are at rest in a predetermined part of their path, cleaning means movable into and out of the space between two separated mold parts, mechanism to advance and retract the cleaning means in harmony with the step-by-step movement of the molds, and means for actuating the cleaning means.

18. In a machine for making die-molded articles of plastic material, in combination, a series of intermittently traveling molds having separable tops, mold-opening means in the path of the molds to separate the tops from the molds as the latter pass, a supply receptacle for plastic material, a loading hopper movable between the supply receptacle and the open mold to receive plastic material from the former and deliver the same to the latter, and means for actuating the loading hopper in harmony with the intermittent movement of the molds.

19. In a machine for making die-molded articles of plastic material, in combination, a mold composed of relatively movable parts, a toggle-press to press the mold parts together, and means for carrying both of the relatively movable parts of the mold into and out of cooperation with the toggle press.

20. In a machine for making die-molded articles of plastic material, in combination, a traveling mold composed of relatively movable parts, a track along which the mold travels, presser-rails adjacent to the track to receive the mold between them and the track, toggle mechanism for actuating the presser-rails, and means for operating the toggle mechanism in harmony with the travel of the mold.

21. In a machine for making die-molded articles of plastic material, in combination, a series of traveling molds composed of relatively movable parts, a horizontal track on which the molds travel, presser-rails above the track to receive the molds under them as the molds pass, toggle-mechanism associated with the presser rails to depress the latter, and means for actuating the toggle mechanism in harmony with the travel of the molds.

22. In a machine for making die-molded articles of plastic material, in combination, a series of traveling molds composed of relatively movable parts, a track on which the molds travel step-by-step, a pair of presser rails above the track to receive the molds under them, toggle levers connected with the presser-rails to raise and depress the same, and mechanism connected with the toggle levers to buckle and straighten the toggle levers in harmony with the step-by-step movement of the molds.

In testimony whereof I hereto affix my signature.

ERNEST DE JOURNO.